Patented Oct. 20, 1936

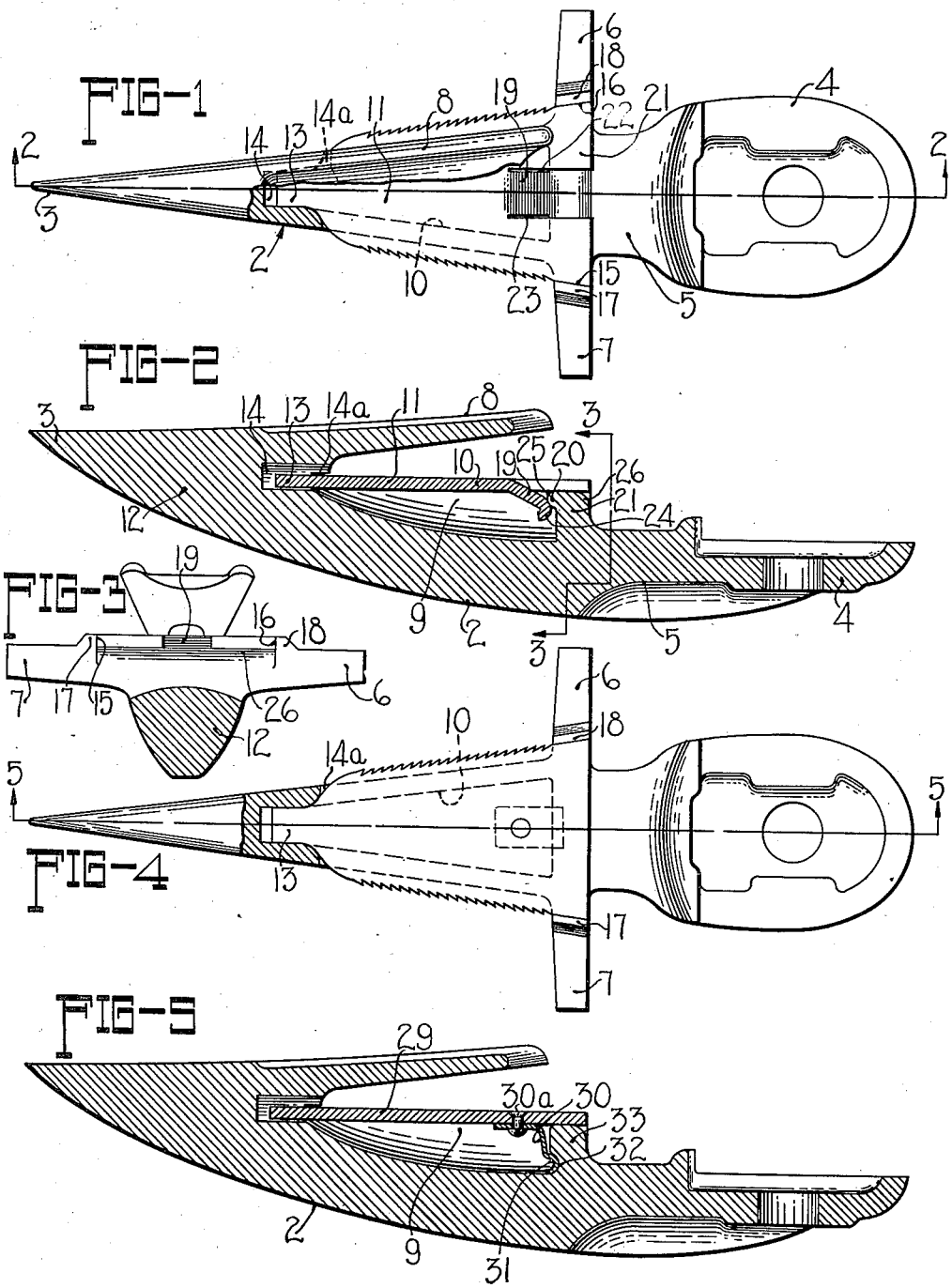

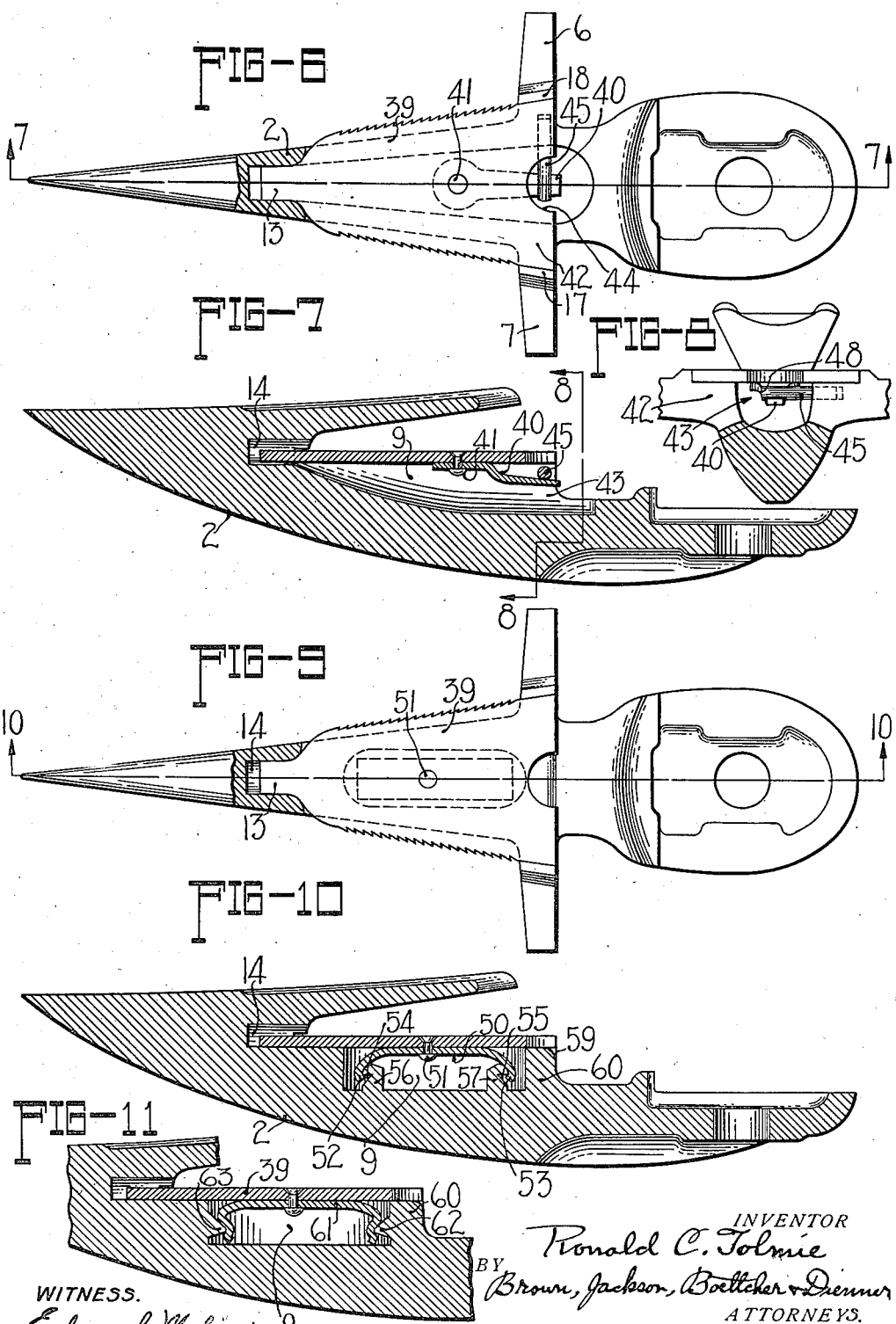

2,057,860

UNITED STATES PATENT OFFICE 2,057,860

CUTTING MECHANISM

Ronald C. Tolmie, Rock Island, Ill., assignor to Deere & Company, Moline, Ill., a corporation of Illinois Application April 28, 1933, Serial No. 668,338

22 Claims. (Cl. 56—311)

The present invention relates generally to cutting mechanisms, more particularly to agricultural implements such as reaping and mowing machines and the like, and the principal object of the present invention is the provision of a new and improved quick detachable ledger plate for the guard finger of a mower cutter bar or other cutting mechanism.

The common way of attaching the ledger plates to the finger bar is by means of a single rivet in each of the plates. In such cases, when it is desired to replace a ledger plate so fastened, it is necessary to shear the rivet and insert a new one. This is not considered especially unsatisfactory except in those cases where the mower or other implement is being used under severe operating conditions which make it necessary to frequently renew the ledger plates. To better meet the requirements of these latter conditions, various forms of quick detachable ledger plates have been designed. The present invention contemplates the provision of a novel form of quick detachable ledger plates which can be easily attached and detached and when attached is positively and securely held in proper position. This is an important feature of the present invention in that serious trouble can result from the ledger plates being out of alignment or loose in the guards.

Another object of the present invention is the provision of a quick detachable ledger or guard plate construction in which the ledger plate itself is of sturdy and simple construction and can be easily and inexpensively manufactured.

Still further, another object of the present invention is the provision of a quick detachable ledger plate having improved spring means for locking the ledger plate in position on the guard and which can be easily and quickly detached therefrom.

Still further, another object of the present invention is the provision of new and improved guard and ledger plate construction in which the ledger plates are quickly detachable and in which the guards, accommodating such quick detachable ledger plates, are of simple construction and do not involve complicated machining and casting processes during the manufacture of the guard or guard finger.

These and other objects of the present invention will be apparent from the following detailed description of several embodiments illustrating the principles of the present invention, taken in conjunction with the drawings illustrating such embodiments.

In the drawings:

Figure 1 is a plan view of one form of mower guard or guard finger with the ledger or guard plate attached thereto, certain parts of the lip of the guard being broken away to better show the construction and arrangement of the ledger plate;

Figure 2 is a section taken along the line 2—2 of Figure 1;

Figure 3 is a section taken along the line 3—3 of Figure 2;

Figure 4 is a modified form of guard finger and ledger plate construction embodying a separate spring finger associated with the ledger plate for holding the latter in place in the guard;

Figure 5 is a section taken along the line 5—5 of Figure 4;

Figure 6 is another modified form of guard and guard plate construction;

Figure 7 is a section taken along the line 7—7 of Figure 6;

Figure 8 is a section taken along the line 8—8 of Figure 7;

Figure 9 is a plan view of a third modified form of guard and guard plate construction;

Figure 10 is a section taken along the line 10—10 of Figure 9; and

Figure 11 is a fragmentary section corresponding to the section shown in Figure 10 but illustrating a slightly different form of guard finger and ledger plate construction.

Referring now to the drawings, the guard or guard finger employed in the present invention consists of a main body portion 2 terminating at one end in a forwardly directed pointed portion 3 and at the other end in an attaching section 4 connected with the main body portion 2 of the guard by means of a neck 5. Adjacent the neck section 5 and the rear portion of the main body 2 of the guard, wings 6 and 7 are provided, and extending rearwardly from the forward portion of the guard is a guard lip 8 spaced above a cavity 9 formed in the main body portion of the guard finger. The periphery of the cavity 9, or at least a portion thereof, serves as a ledger plate seat 10 for receiving the guard or ledger plate with which most guards are conventionally equipped.

The present invention may be embodied in several different constructions, but in all such constructions the essential features of the guard fingers mentioned above are utilized, and in such cases like reference numerals are employed.

In the form of the invention shown in Figures 1, 2, and 3, the guard or ledger plate is shown at 11 and is provided at its forward end with a reduced neck portion 13 which fits closely between the side walls of a socket or recess 14 formed adjacent the forward portion of the guard finger 2 and at, or actually serving as a continuation of, the forward end of the guard cavity 9. When in position on the guard 2, the ledger plate 11 at its rear end fits snugly, between and has its sides in contact with a pair of laterally spaced shoulders 15 and 16 provided on the inner or adjacent sides of lugs 17 and 18. At the forward end, portions of the ledger plate adjacent the neck portion 13 of the ledger plate 11 fit snugly in slots or recesses 14a cut in the side walls of the socket 14, as best shown in Figures 1 and 2, and since the shoulders 15 and 16 fit against the sides of the rear end of the ledger plate, it will be seen that the latter is positively held against lateral movement with respect to the guard finger 2 as long as the ledger plate is in position thereon.

The laterally spaced lugs 17 and 18 are preferably formed on and extend upwardly of the guard wings 6 and 7 which, with adjacent portions of the guard finger, serve as a rear wall 21 carried by the guard finger and closing the rear end of the recess 9. As will be obvious, of course, the rear wall need not entirely close the guard finger recess 9.

The rear end of the ledger plate 11 is held in position by means of a spring portion 19, which is in this construction preferably formed integral with the ledger plate 11, engaging below a forwardly extending shoulder or projection 20 formed adjacent the forward edge of the rear wall 21 of the guard finger. Where the spring finger 19 is integral with the ledger plate 11, the member 19 is preferably formed by cutting slots 22 and 23 in the rear end of the ledger plate and bending down the intermediate portion, the latter operation being done before the ledger plate is hardened.

The tip of the spring portion 19 is rounded, as shown at 24, and the upper edge of the forwardly extending projection 20 is similarly beveled, as shown at 25, to facilitate the placing of the ledger plate in position. To place the ledger plate 11 in position, it is merely necessary to first insert the neck portion 13 in the socket 14 on the guard finger, and then the top of the rear end of the ledger plate is tapped with a hammer or similar tool, the rounded portion 24 engaging the beveled edge 25 and causing the spring to flex sufficiently to snap past the projection 20 into the position shown in Figure 2.

From the above description it will therefore be apparent that as long as the spring finger 19, carried by the ledger plate 11, is disposed under and in contact with the abutment or shoulder 20, not only is the forward end 13 of the ledger plate securely held in the slots 14a but the ledger plate as a whole is held down against its seat 10 and in between the shoulders 15 and 16 formed by the lugs 17 and 18. It is important to note in this connection that both sides of the ledger plate are in firm contact with the lugs 17 and 18 or the shoulders 15 and 16 so that there is little tendency for the ledger plate to work loose in operation.

The removal of the ledger plate 11 for repair or replacement is as simple as is its installation in the first place. The rear upper corner of the wall 21 is beveled, as shown at 26, to receive a pointed or flattened tool, such as a screw driver, cold chisel or the like. By inserting the tool in between the rear wall 21 and the rear end of the ledger plate 11 and then giving it a sharp blow, as with a hammer or the like, the spring 19 is snapped past the shoulder 20 and the ledger plate 11 is freed and can be slipped out of the guard 2.

The form of the invention shown in Figures 4 and 5 is similar to that shown in Figures 1, 2, and 3 except that the ledger plate is not slotted, as at 22 and 23 in the modification shown in Figure 1. In Figures 4 and 5, the ledger plate is indicated by the reference numeral 29 and is retained in position by means of a spring 30 formed as an element separate from the ledger plate itself and riveted to the bottom surface of the ledger plate adjacent the rear end thereof by a rivet 30a.

The lower and rear end of the spring 30 is rounded, as shown at 31, to engage in a similarly shaped recess or undercut 32 formed at or near the bottom of the cavity 9 and the forward edge of the rear wall of the guard finger 2, the rear wall of the guard finger in this modification being indicated by the reference numeral 33 but being identical, for all practical purposes, with the rear wall 21 shown in Figure 2 except that the forward edge of the same is of slightly different construction. As a matter of fact, in Figures 1, 2, and 3, the integral spring member 19, carried by the ledger plate 11, could be arranged to engage in an undercut recess in the wall 21 similar to the recess 33 shown in Figure 5 if desired. Similarly, the spring finger 30 could be arranged to engage underneath a shoulder or forwardly extending projection on the forward edge of the rear wall 33, just as the rear rounded end of the spring finger 19 engages under the shoulder 20 in Figure 2. Whether the ledger plate retaining means is disposed underneath a forwardly projecting shoulder or in an undercut recess, it is to be understood that the forward edge of the wall of the guard finger, being formed with such undercut recess or such projection, serves as lug means extending into the guard cavity 9 from one wall thereof and under which, or in cooperation with which, the ledger plate retaining means is adapted to engage.

In Figures 4 and 5, it is to be noted that the attachment of the forward end 13 of the ledger plate in the front portion of the guard 2 is substantially the same as shown in Figures 1, 2, and 3 and described above.

In the embodiment shown in Figures 6, 7, and 8, the means for retaining the ledger plate in position comprises a spring lever 40 pivotally connected to the underside of the ledger plate by means of a pivot 41. In this form the guard finger 2 is provided with a rear wall 42 which is notched out, as shown at 43, so that the sides thereof form a continuation of the sides of the guard finger cavity 9. Lug means in the form of a pin 45 is anchored in one side wall of the cavity 9 near the rear thereof and extends inwardly of the cavity beyond the center thereof. The pin 45, as will be obvious, can also be considered as a continuation of the rear wall 42 and as constituting shoulder means or the equivalent, similar to the shoulder means or the undercut portion shown in Figures 2 and 5 and described above.

The spring lever 40 may be rotated about its pivot 41 to bring the rear end underneath the pin 45, and to facilitate the movement of the spring lever 40 into this position, the end of the pin 45 has been rounded, as shown at 46, and the underside of the pin adjacent the center of the guard finger has been recessed slightly, see Figure 8, for receiving and holding the spring lever 40 in position. The pin 45 is so positioned and the spring lever 40 so formed that when the lever 40 is locked underneath the pin, the lever is under considerable tension and serves to lock the ledger plate in position on its seat. It is to be noted that the rear wall 42 in this modification is also provided with the laterally spaced abutments or lugs 17 and 18 which are adapted to contact with the sides of the ledger plate and to hold the same against lateral displacement with respect to the guard finger. The rear end of the ledger plate is provided with a notch 44 to facilitate shifting the lever 40.

To remove the ledger plate it is merely necessary to rotate the spring lever 40 clockwise, as viewed in Figure 6, an amount sufficient to clear the end of the pin 45. The ledger plate may then be lifted free from the guard finger 2.

In the modification shown in Figures 9 and 10, the ledger plate is of substantially the same form shown in Figures 6 and 7 and is indicated by the same reference numeral 39. The means for retaining the ledger plate 39 in position in Figures 9 and 10 comprises a double spring 50 which is riveted to the underside of the ledger plate by means of a rivet 51. Each end of the spring 50 is curved downwardly and the tip portions are curved inwardly, as shown at 52 and 53. These inwardly curved portions are adapted to engage in recesses 54 and 55 provided in lugs or posts 56 and 57 extending upwardly into the cavity 9 of the guard finger. It is to be noted that the rear post or lug 57 is disposed closely adjacent the forward edge of the rear wall 60 of the guard finger.

The ledger plate 39 in Figures 9 and 10 is inserted in substantially the same way as the ledger plate 11 of Figures 1 to 3, namely, by inserting the forward end 13 of the ledger plate in the recess 14 at the front end of the guard finger 2 and then tapping the top of the rear end of the ledger plate with a hammer or similar tool. Likewise, the ledger plate is also removed in the same manner as the ledger plate 11 of Figures 1 to 3, namely, by inserting a pointed tool in the space between the underside of the ledger plate 39 and the beveled edge 59 of the rear wall 60 of the guard finger 2.

Figure 11 shows a construction similar to that illustrated in Figure 10 with the exception that the ends of the double spring, indicated in Figure 11 by the reference numeral 61, have been bent so as to cooperate with inwardly extending lugs or projections 62 and 63 formed in the end walls of the guard finger 79. While it is preferable, in this construction, to employ a double spring 61 and two lugs 62 and 63, it will be apparent that the forward end of the spring 61 and the forward lug 63 can be omitted if desired. In this case, therefore, the ledger plate 39 would be held in position by the downwardly and rearwardly extending spring portion of the spring 61 and the forwardly projecting shoulder 62 carried at or adjacent the forward edge of the rear wall 60. Similarly, the rear end of the spring 61 could be made to engage in an undercut recess, similar to that shown in Figure 5. As a matter of fact, the portion of the guard underneath the lug 62 constitutes, in effect, an undercut recess with which the spring 61 cooperates.

While I have described above the construction in which the principles of the present invention have been embodied, it is apparent that my invention is not to be limited to the specific details shown and described, but that, in fact, widely different means may be employed in carrying out the broader aspects of my invention.

What I claim, therefore, and desire to secure by Letters Patent is:

1. The combination with a guard finger having a cavity in the main body portion thereof, a ledger plate seat at least partially surrounding said cavity, and lug means carried by the guard finger and extending into said cavity adjacent the rear portion thereof, of a ledger plate bearing on said seat and connected with the guard finger at its forward end, and spring means carried by said ledger plate adjacent the rear end thereof and having its free end extending rearwardly and adapted to engage said lug means in the rear portion of said cavity for locking the ledger plate down against the ledger plate seat.

2. The combination with a guard finger having a cavity in the main body portion thereof, a ledger plate seat at least partially surrounding said cavity, a recess in the front end thereof, a rear wall, and lug means extending into the cavity of the guard finger adjacent the rear portion thereof, of a ledger plate bearing on said seat, the front end of the ledger plate extending into said recess, whereby the front end of the ledger plate is held against lateral movement with respect to the guard finger, means on said rear wall engaging the rear of said ledger plate, whereby the rear end of the ledger plate is held against lateral movement with respect to the guard finger, and means carried by the rear portion of the ledger plate and extending rearwardly for engagement with said lug means, said rearwardly extending means being formed and cooperating with said lug means to exert a generally downwardly directed force on the ledger plate to lock the ledger plate on its seat.

3. The combination with a guard finger having a ledger plate seat, a recess in its front end, and lug means disposed adjacent the rear edge of the ledger plate seat and having an undercut surface, of a ledger plate bearing on said seat, the front end of the ledger plate extending into said recess whereby the front end of the ledger plate is held against lateral movement with respect to the guard finger, means adjacent the rear edge of the ledger plate seat adapted to engage the rear portion of the ledger plate, whereby the rear of the ledger plate is held against lateral movement with respect to the guard finger, and means carried by the ledger plate and extending downwardly and rearwardly for engaging with the undercut surface of said lug means to lock the ledger plate on its seat.

4. Cutting mechanism comprising a guard finger having a ledger plate seat, a recess at its front end, and a rear wall, a ledger plate bearing on said seat, the front end of the ledger plate extending into said recess whereby the front end of the ledger plate is held against lateral movement with respect to the guard finger, laterally spaced lugs carried by said rear wall, the rear end of the ledger plate fitting between said lugs and contacting therewith, whereby the rear of the ledger plate is held against lateral movement with respect to the guard finger, lug means carried by said guard finger adjacent said rear wall and having means serving as an undercut surface, and a spring fixed to the rear end of the ledger plate and extending downwardly and rearwardly and yieldingly engaging said undercut surface means on the lug means to exert a generally upwardly directed force against the lug means for locking the ledger plate on its seat.

5. Cutting mechanism comprising a guard finger having a ledger plate seat and a rear wall provided with a forwardly projecting shoulder and a pair of laterally spaced upwardly extending lugs, a ledger plate the rear end of which fits snugly between said lugs, whereby the rear end of the ledger plate is held against lateral movement with respect to the guard finger, and a resilient spring fixed to the rear end of the ledger plate extending downwardly and yieldingly engaging said shoulder.

6. The combination with a guard finger having a ledger plate seat, a socket in its front end, slots in the walls of said socket, and a rear wall provided with a forwardly projecting shoulder and a pair of laterally spaced upwardly extending lugs, of a ledger plate the front end thereof fitting snugly in said slots whereby the front end of the ledger plate is held down upon said ledger plate seat, said ledger plate having a forwardly extending neck at its front end extending into said socket, the sides thereof fitting snugly in said socket whereby the front end of the ledger plate is held against lateral movement with respect to the guard finger, the rear end of the ledger plate fitting snugly between said lugs, whereby the rear end of the ledger plate is held against lateral movement with respect to the guard finger, and resilient means carried by the ledger plate and reacting upwardly against the forwardly projecting portion of said shoulder for locking the rear end of the ledger plate to said guard finger.

7. The combination with a guard finger having a ledger plate seat and a rear wall, the forward edge of said rear wall having an undercut portion, of a ledger plate adapted to bear on said seat, cooperating means adjacent the front end portions of the guard finger and said ledger plate for securing the front end of the ledger plate in position on its seat, and spring means carried by the ledger plate and comprising a separate member fixed to the under side of the ledger plate and extending downwardly and rearwardly therefrom and reacting against said undercut portion for holding the rear end of the ledger plate downwardly against its seat.

8. The combination with a guard finger having a ledger plate seat, a socket in its front end, and a rear wall provided with a forwardly projecting shoulder, of a ledger plate the front end thereof having a forwardly extending neck at its front end extending into said socket, the rear end of the ledger plate having spaced longitudinally extending slots, the portion between the slots being bent downwardly and defining a spring and yieldingly engaging the under portion of said shoulder to hold the neck of the ledger plate in said socket and the ledger plate down against its seat.

9. The combination with a guard finger having a ledger plate seat, a recess at its front end, and a rear wall having a spring receiving undercut portion adjacent the forward edge of the rear wall and below said ledger plate seat, of a ledger plate bearing on said seat, the front end of the ledger plate extending into said recess, whereby the front end of the ledger plate is held against lateral movement with respect to the guard finger, means on said rear wall engaging the sides of the rear end of the ledger plate, whereby the rear of the ledger plate is held against lateral movement with respect to the guard finger, and a spring fixed at its forward end to the rear portion of the ledger plate and extending downwardly and rearwardly to engage the undercut portion of said rear wall below said ledger plate seat for locking the ledger plate onto its seat.

10. The combination with a guard finger having a cavity in the main body portion thereof, a ledger seat at least partially surrounding said cavity, and a rear wall having an undercut portion at its forward edge adjacent the bottom of said cavity, of a ledger plate adapted to bear on said seat, cooperating means on the front portions of the guard finger and said ledger plate for holding the front end of the latter against lateral movement with respect to the guard finger, and means carried by the rear portion of the ledger plate and extending downwardly and rearwardly into the undercut portion of said rear wall for locking the rear end of the ledger plate to said guard finger.

11. Cutting mechanism comprising a guard finger having a ledger plate seat and a cavity therein, a pin anchored to the guard finger and extending into said cavity, and a ledger plate bearing on said seat and having a member movably mounted on the underside thereof and shiftable into a position under said pin to lock the ledger plate on the seat.

12. The combination with a guard finger having a ledger plate seat and a cavity therein and a pin anchored in the side wall of the cavity and extending laterally into said cavity above the bottom thereof, of a ledger plate bearing on said seat and having a spring lever pivoted to the under side thereof in a position thereon to be rotatable under said pin when the ledger plate is mounted on its seat so as to lock the plate thereon.

13. The combination with a guard finger having a ledger plate seat and a cavity therein open at the rear and a pin anchored in the side wall of the cavity adjacent the rear thereof and extending above the bottom of the cavity laterally towards the opposite side wall thereof, of a ledger plate bearing on said seat and having a lever pivoted on the under side and extending rearwardly and adapted to be rotated beneath said pin when the ledger plate is mounted on its seat on the guard finger.

14. Cutting mechanism comprising a guard finger having a ledger plate seat and a cavity therein, a ledger plate bearing on said seat and having a spring supported near its center from the under side thereof, and means carried by said guard finger adjacent each end of said cavity and engaging the ends of said spring for holding the ledger plate on said seat.

15. Cutting mechanism comprising a guard finger having a ledger plate seat and a cavity therein, a ledger plate bearing on said seat and having a spring supported near its center from the under side thereof, and means carried by the guard finger extending inwardly of the cavity from the ends of said walls thereof for engaging the ends of said spring to hold the ledger plate on its seat.

16. The combination with a guard finger having a cavity in the main body portion thereof, a ledger plate seat at least partially surrounding said cavity, and lug means extending into said cavity adjacent the rear portion thereof, of a ledger plate bearing on said seat and connected with the guard finger at its forward end, and downwardly and rearwardly extending spring means carried by the ledger plate and having a rounded end adapted to engage underneath said lug means on the guard finger for holding the ledger plate down against said ledger plate seat.

17. The combination with a guard finger having a cavity in the main body portion thereof, a ledger plate seat at least partially surrounding said cavity, and lug means extending into said cavity adjacent the rear portions thereof, of a ledger plate bearing on said seat and connected with the guard finger at its forward end, and means rotatably carried by the ledger plate adjacent the rear end thereof and adapted to be shifted into engagement with said lug means on the guard finger for locking the ledger plate on the ledger plate seat.

18. The combination with a guard finger having a cavity in the main body portion thereof, a ledger plate seat at least partially surrounding said cavity, and lug means extending into said cavity adjacent the rear portion thereof, of a ledger plate bearing on said seat and connected with the guard finger at its forward end, and spring means rotatably carried by the ledger plate adjacent the rear end thereof and adapted to be rotated into engagement with the under portion of said lug means on the guard finger for holding the ledger plate down against its seat.

19. Cutting mechanism comprising a guard finger having a cavity in the main body portion thereof and a generally forwardly disposed projection adjacent the rear portion of said cavity, a ledger plate adapted to seat over said cavity, cooperating means at the forward end of said ledger plate and guard finger for holding the ledger plate in position on the guard finger and restraining the ledger plate against displacement relative to the guard finger, and a generally downwardly and rearwardly disposed resilient member carried by the rear portion of said ledger plate and having a rounded end adapted to spring over said forwardly extending projection and to react against the under portion thereof for holding the ledger plate downwardly against its seat on the guard finger.

20. The combination with a guard finger having a cavity in the main body portion thereof, a ledger seat at least partially surrounding said cavity, and a rear wall having an undercut portion at its forward edge, of a ledger plate adapted to bear on said seat, cooperating means on the front portions of the guard finger and said ledger plate for holding the front end of the latter against lateral and forward movement with respect to the guard finger, and a separate spring member permanently secured to the guard finger and extending generally downwardly and having an end formed to spring into said undercut portion when the ledger plate is forced down onto its seat for the purpose of reacting generally upwardly and rearwardly against said undercut portion to lock the ledger plate to the guard finger, said spring member being adapted to yield when the ledger plate is forcibly removed from its seat, thereby providing for the detachability of said ledger plate.

21. Cutting mechanism comprising a guard finger having a ledger plate seat and a cavity therein, a ledger plate bearing on said seat, spring means separate from said ledger plate and secured at its forward end to the under side of the ledger plate adjacent the rear end thereof, and means including an undercut portion adjacent the rear end of said cavity for receiving the rear end of said spring means.

22. Cutting mechanism comprising a guard finger having a ledger plate seat and a rear wall having a forwardly facing undercut portion adjacent the bottom of the cavity, a ledger plate bearing on said seat, and a separate spring member having a flat forward end riveted to the rear portion of the ledger plate and extending downwardly and rearwardly therefrom and terminating in a rounded portion adapted to engage the undercut portion of said rear wall for locking the ledger plate onto its seat.

RONALD C. TOLMIE.